(12) United States Patent
Yoon et al.

(10) Patent No.: US 7,730,331 B2
(45) Date of Patent: Jun. 1, 2010

(54) METHOD FOR CONTROLLING POWER IN MOBILE PHONE, AND MOBILE PHONE IMPLEMENTING THE SAME

(75) Inventors: Sang-Sik Yoon, Youngdeungpo-gu (KR); Hong-Woo Lee, Bundang-gu (KR)

(73) Assignees: Pantech Co., Ltd., Seoul (KR); SK Telecom Co., Ltd., Seoul (KR)

( * ) Notice: Subject to any disclaimer, the term of this patent is extended or adjusted under 35 U.S.C. 154(b) by 890 days.

(21) Appl. No.: 11/393,417

(22) Filed: Mar. 30, 2006

(65) Prior Publication Data
US 2006/0242441 A1 Oct. 26, 2006

(30) Foreign Application Priority Data
Apr. 26, 2005 (KR) ............... 10-2005-0034600

(51) Int. Cl.
*G06F 1/32* (2006.01)
(52) U.S. Cl. .................. 713/300; 713/320
(58) Field of Classification Search ........... 713/300, 713/320
See application file for complete search history.

(56) References Cited

U.S. PATENT DOCUMENTS 7,072,628 B2 * 7/2006 Agashe et al. ............ 455/140

\* cited by examiner

*Primary Examiner*—Tse Chen
(74) *Attorney, Agent, or Firm*—H.C. Park & Associates, PLC

(57) ABSTRACT

Disclosed herein is a method of controlling power consumption of a mobile communication terminal, and a mobile communication terminal in which the method is implemented. The mobile communication terminal, having peripheral devices, such as a speaker, Liquid Crystal Display (LCD) and a camera, and a diversity unit for implementing a diversity function, includes a power measurement unit and a control unit. The power measurement unit measures power consumed in the diversity unit. The control unit controls the power consumption of the peripheral devices based on the amount of consumed power read from the power measurement unit. Accordingly, the power consumption of the peripheral devices is appropriately controlled, so that unnecessary power consumption can be reduced, therefore the lifespan of a battery can be prolonged.

14 Claims, 4 Drawing Sheets

METHOD FOR CONTROLLING POWER IN MOBILE PHONE, AND MOBILE PHONE IMPLEMENTING THE SAME

CROSS REFERENCE TO RELATED APPLICATION

This application claims priority from and the benefit of Korean Patent Application No. 10-2005-0034600, filed on Apr. 26, 2005.

BACKGROUND OF THE INVENTION

1. Field of the Invention

The present invention relates generally to a method of controlling the power consumption of a mobile communication terminal, and a mobile communication terminal implementing the same, more particularly, to a method of controlling the power consumption of a mobile communication terminal, which measures power consumed in the mobile communication terminal provided with a diversity unit for implementing a diversity function, and controls the power consumption of peripheral devices, such as a speaker and a Liquid Crystal Display (LCD), and a mobile communication terminal implementing the same.

2. Description of the Related Art

Generally, a mobile communication terminal has gradually become small due to the high sensitivity, compactness and light weight of electronic components, and the functions become diverse to fulfill customers' demand. For example, a mobile communication terminal provided with various functions, such as games, Internet search, the reception and transmission of electronic (e)-mail, and the payment of bill, has been popularized. Also recently, a mobile communication terminal, which functions not only as a camera phone that is provided with a camera allowing the capture of objects, but also as a video mobile communication terminal that captures images and transmits the captured images to another person, is being commercialized.

A conventional mobile communication terminal employs a technology for measuring total average consumed power therein, and controlling the power consumption of peripheral devices, such as a speaker, an LCD and a camera, based on the measurement result For example, when total power consumed increases, the power consumption of the peripheral devices, such as a speaker, an LCD and a camera, is lowered, or the function of the speaker is deactivated, so that the power consumption of the peripheral devices can be reduced, which will be described with reference to the accompanying drawings below.

FIG. 1 is a block diagram showing the internal construction of a conventional mobile communication terminal. In FIG. 1, a power measurement unit 300 measures power consumed in the terminal. A control unit 200 reads the consumed power from the power measurement unit 300, and controls the power consumption of peripheral devices 100 based on the amount of the measured consumed power.

FIG. 2 is a flowchart illustrating a method of controlling power consumption in the conventional mobile communication terminal. In the mobile communication terminal, power consumed by the peripheral devices 100 is measured at step S210. Average consumed power is calculated based on the power consumed by the peripheral devices 100 at step S220. The power consumption of the peripheral devices 100 is controlled based on the amount of the average consumed power obtained at step S230. That is, when the average consumed power exceeds a predetermined value, the peripheral devices 100 enter into a power-saving mode, or the brightness of the backlight of the LCD decreases, so that power consumed by the peripheral devices 100 is reduced.

Meanwhile, a diversity function is chiefly used as a method of solving a fading problem on a communication line. For example, two reception antennas are used and, thereby, electric waves are received through two paths, so that fading can be compensated for. That is, the transmission paths of signals are separated according to space, time, or frequency, so that fading can be reduced by comparing two received signals with each other or extracting only appropriate signals from the two received signals.

The mobile communication terminal in which the above described diversity function is implemented, has an advantage in that quality of communication is considerably improved, but has a disadvantage in that the amount of power consumption increases rapidly with communication time and, therefore, the depletion of a battery is faster than that of general mobile communication terminals. Unfortunately, a technology for controlling power consumption in a mobile communication terminal to which diversity is applied has not yet been proposed.

SUMMARY OF THE INVENTION

Accordingly, the present invention has been made keeping in mind the above problems occurring in the prior art, and an object of the present invention is to provide a method of controlling the power consumption of peripheral devices based on the amount of power consumed in a mobile communication terminal in which a diversity function is implemented, and a mobile communication terminal that implements the method.

In order to accomplish the above object, the present invention provides a mobile communication terminal having peripheral devices, such as a speaker, Liquid Crystal Display (LCD) and a camera, and a diversity unit for implementing a diversity function, the mobile communication terminal including a power measurement unit for measuring power consumed in the diversity unit; and a control unit for controlling the power consumption of the peripheral devices based on the amount of consumed power read from the power measurement unit.

The control unit may perform control so that the power consumption of the peripheral devices is reduced when the amount of consumed power read from the power measurement exceeds a predetermined value. Furthermore, the control unit may perform control so that the function of a part of the peripheral devices is deactivated when the amount of consumed power read from the power measurement exceeds a predetermined value. The peripheral devices may include a display device.

In addition, the present invention provides a method of controlling the power consumption of a mobile communication terminal, the mobile communication terminal having a diversity unit for implementing a diversity function, the method including the first step of measuring power consumed in the diversity unit; and the second step of controlling the power consumption of peripheral devices based on the amount of measured consumed power.

The controlling of the power consumption of the peripheral devices, at the second step, may be achieved by performing control so that the power consumption of the peripheral devices is reduced when the power consumed in the diversity unit exceeds a predetermined value. Furthermore, the controlling of the power consumption of the peripheral devices, at the second step, may be achieved by performing control so that function of a part of the peripheral devices is deactivated when the power consumed in the diversity unit exceeds a predetermined value. The peripheral devices include a display device.

In addition, the present invention provides a method of controlling the power consumption of a mobile communication terminal, the mobile communication terminal having a diversity unit for implementing a diversity function, the method including the first step of measuring consumed power in the mobile communication terminal; the second step of setting the operation mode of peripheral devices based on the amount of the measured consumed power; the third step of measuring power consumed in the diversity unit; and the fourth step of controlling the power consumption of the peripheral devices based on the amount of the second measured consumed power.

The operation mode of the peripheral devices may be set to a power-saving mode for lowering the power consumption of the peripheral devices when, at the second step, the measured consumed power measured exceeds a predetermined value, and may be set to a normal operation mode when the measure consumed power does not exceed the predetermined value. Furthermore, the operation mode of the peripheral devices may be set to an idle mode for ceasing the operation of the peripheral devices when, at the second step, the measured consumed power exceeds a predetermined value, and may be set to a normal operation mode when the measured consumed power does not exceed.

The fourth step may be to perform control so that the power consumption of the peripheral devices is reduced when the power consumed in the diversity unit exceeds a predetermined level in the case where, at the second step, the operation mode of the peripheral devices is set to a normal operation mode. Furthermore, the fourth step may be to deactivate the function of a part of the peripheral devices when the power consumed in the diversity unit exceeds a predetermined level in the case where, at the second step, the operation mode of the peripheral devices is set to a normal operation mode.

Furthermore, the fourth step may be to perform control so that the power consumption of the peripheral devices is even further reduced or may include a process of deactivating the function of a part of the peripheral devices, when the power consumed in the diversity unit exceeds a predetermined level in the case where the operation mode of the peripheral devices is set to a power-saving mode.

In addition, the present invention provides a mobile communication terminal having peripheral devices, such as a speaker, an LCD, and a camera, and a diversity unit for implementing a diversity function, the mobile communication terminal including a first power measurement unit for measuring power consumed in the mobile communication terminal; a second power measurement unit for measuring power consumed in the diversity unit; a control unit for setting the operation mode of the peripheral devices based on the amount of the measured consumed power, and controlling the power consumption of the peripheral devices based on an amount of the power by the second power measurement unit and consumed in the diversity unit.

The control unit may set the operation mode of the peripheral devices to a power-saving mode for lowering the power consumption of the peripheral devices when the consumed power exceeds a predetermined value, and may set the operation mode of the peripheral devices to a normal operation mode when the consumed power does not exceeded the predetermined value. Furthermore, the control unit may set the operation mode of the peripheral devices to an idle mode for ceasing operation of the peripheral devices when the consumed power exceeds a predetermined value, and may set the operation mode of the peripheral devices to a normal operation mode when the consumed power does not exceed the predetermined value.

The control unit may perform control so that the power consumption of the peripheral devices is reduced when the power consumed in the diversity unit exceeds a predetermined level in a case where the operation mode of the peripheral devices is set to a normal operation mode. Furthermore, the control unit may deactivate the function of a part of the peripheral devices, for example, the function of a backlight, when the power consumed in the diversity unit exceeds a predetermined level in the case where the operation mode of the peripheral devices is set to a normal operation mode.

Furthermore, the control unit may perform control so that the power consumption of the peripheral devices is even further reduced or deactivate the function of a part of the peripheral devices, when the power consumed in the diversity unit exceeds a predetermined level in the case where the operation mode of the peripheral devices is set to a power-saving mode.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
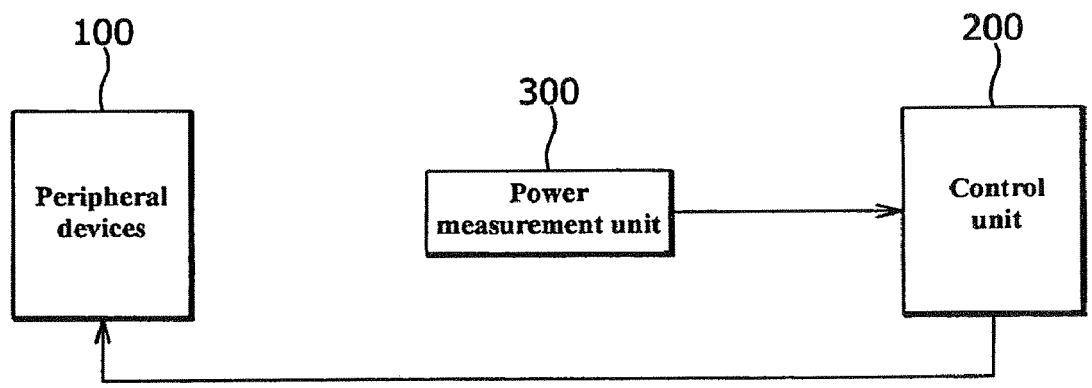
FIG. 1 is a block diagram showing the internal construction of a conventional mobile communication terminal.
Figure 2:
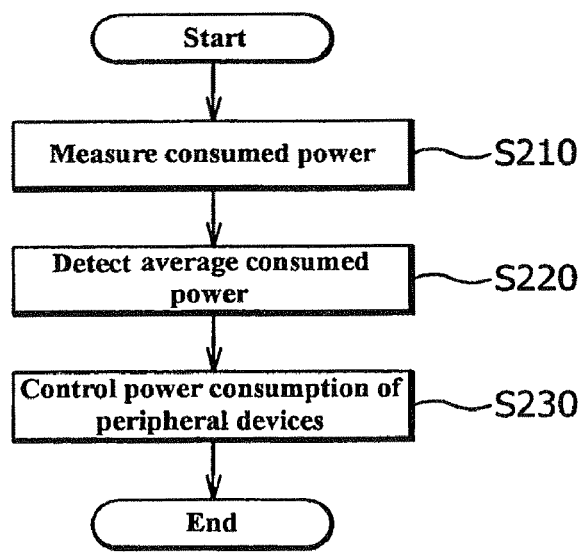
FIG. 2 is a flowchart illustrating a method of controlling the power consumption of the conventional mobile communication terminal.

The embodiments of the present invention are described in detail with reference to the accompanying drawings below. It should be noted that the same reference numerals are used throughout the different drawings to designate the same or similar components. If it is determined that detailed descriptions of well-known functions or constructions may be unnecessary and/or make the gist of the present invention unclear, the detailed descriptions will be omitted.

Figure 3:
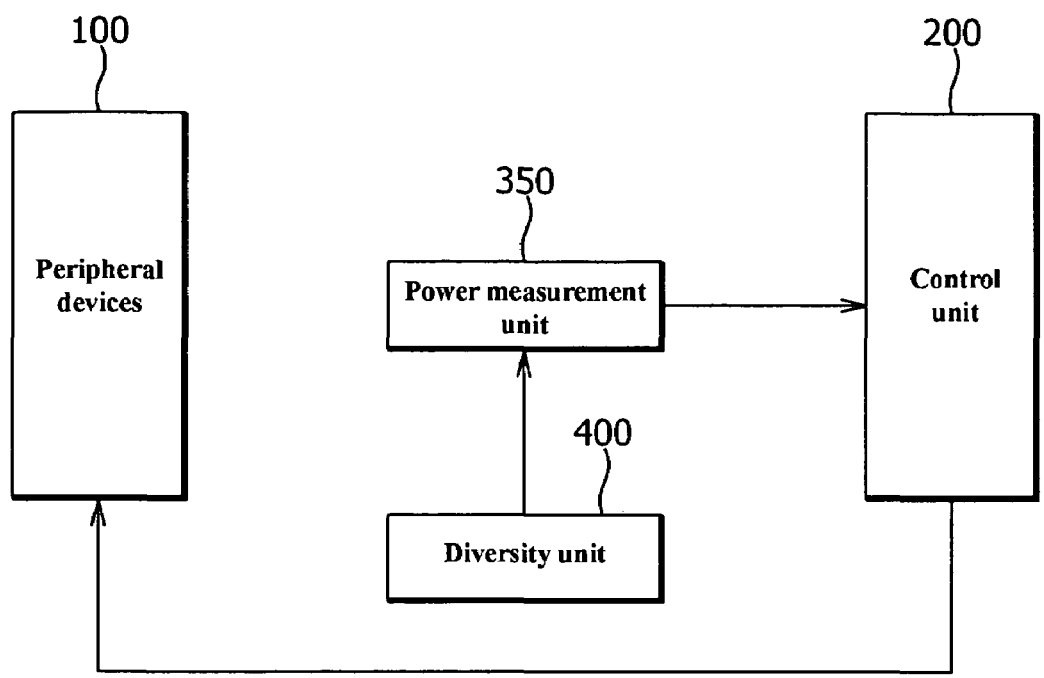
FIG. 3 is a block diagram showing the internal construction of a mobile communication terminal according to an embodiment of the present invention.

FIG. 3 is a block diagram showing the internal construction of a mobile communication terminal according to an embodiment of the present invention. The mobile communication terminal includes peripheral devices 100, a power measurement unit 350, a control unit 200, and a diversity unit 400.

The diversity unit 400 functions to implement a diversity function. The power measurement unit 350 measures power consumed in the diversity unit 400.

The control unit 200 controls the power consumption of the peripheral devices 100 based on the amount of consumed power. In this case, the control unit 200 may calculate the amount of average consumed power, and control the power consumption of the peripheral devices 100 based on the amount of average consumed power. In an embodiment of the present invention, the peripheral devices 100 may be a speaker, a display device, and a camera.

In an embodiment of the present invention, the control unit 200 may perform control so that the power consumption of the peripheral devices 100 is reduced when the amount of power read from the power measurement unit 350 exceeds a predetermined value. Furthermore, the control unit 200 can perform control so that the function of a part of the peripheral devices 100 is deactivated when the amount of power read from the power measurement unit 350 exceeds the predetermined value. For example, of the peripheral devices 100, the function of a camera may be deactivated under the control of the control unit 200. Besides, the method in which the control unit 200 controls the power consumption of the peripheral devices 100 may be implemented in various forms according to embodiment.

Figure 4:
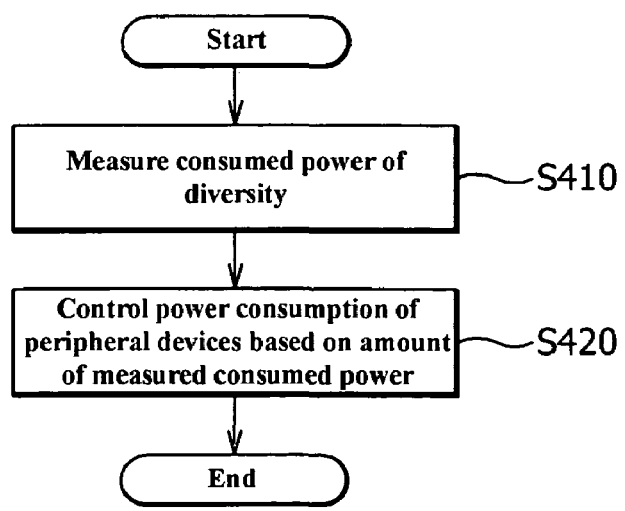
FIG. 4 is a flowchart illustrating a method of controlling the power consumption of the mobile communication terminal according to an embodiment of the present invention.

FIG. 4 is a flowchart illustrating a method of controlling the power consumption in the mobile communication terminal according to an embodiment of the present invention.

The control unit 200 of the mobile communication terminal measures power consumed in the diversity unit 400 at step S410. Thereafter, the control unit 200 of the mobile communication terminal controls the power consumption of the peripheral devices 100 based on the amount of measured power obtained at step S420.

The method of controlling the power consumption of peripheral devices 100 at step S420 can be performed such that the power consumption of the peripheral devices 100 is reduced when the power consumed in the diversity unit 400 exceeds a predetermined value. Alternatively, the method may perform control such that the function of a part of the peripheral devices 100 is deactivated when the power consumed in the diversity unit 400 exceeds the predetermined value. For example, the function of a display device that belongs to the peripheral devices 100 may be deactivated.

In accordance with another embodiment of the present invention, a conventional operation of switching the operation mode of the terminal or the operation mode of the peripheral devices to a power-saving mode can be performed without change when the total average consumed power in the terminal exceeds the predetermined value and, at the same time, an operation of controlling the power consumption of the peripheral devices based on the amount of the power consumed in the diversity unit can be additionally performed.

Figure 5:
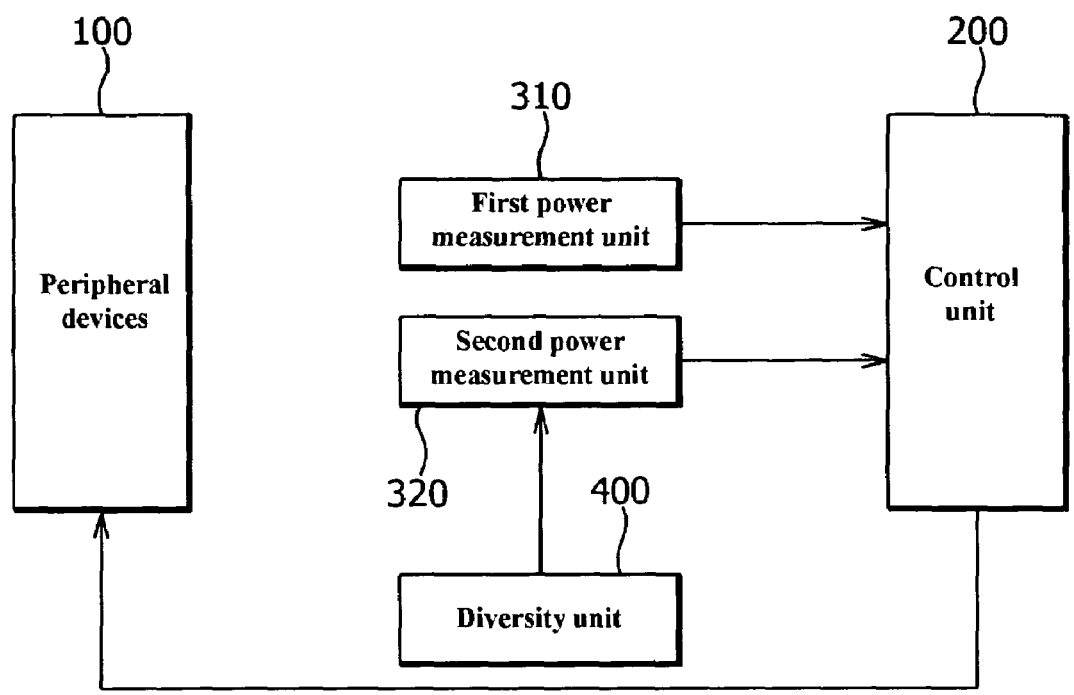
FIG. 5 is a block diagram showing the internal construction of a mobile communication terminal according to another embodiment of the present invention.

FIG. 5 is a block diagram showing the internal construction of a mobile communication terminal according to another embodiment of the present invention. The mobile communication terminal includes peripheral devices 100, a first power measurement unit 310, a second power measurement unit 320, a control unit 200, and a diversity unit 400.

The diversity unit 400 functions to implement a diversity function. The first power measurement unit 310 measures power consumed in the mobile communication terminal. The second power measurement unit 320 measures power consumed in the diversity unit 400.

The control unit 200 sets the operation mode of the peripheral devices 100 based on the amount of consumed power read from the first power unit 310, and controls the power consumption of the peripheral devices 100 based on the amount of the power consumed in the diversity unit 400 and read from the second power measurement unit 320. In this case, the control unit 200 may calculate the amount of average consumed power, and control the power consumption of the peripheral devices 100 based on the amount of average consumed power. In an embodiment of the present invention, the peripheral devices 100 may be a speaker, a display device, and a camera.

In an embodiment of the present invention, the control unit 200 may be set the operation mode of the peripheral devices 100 to a power-saving mode for lowering the power consumption of the peripheral devices 100 when the amount of the average consumed power in the peripheral devices 100 exceeds a predetermined value, and may set the operation mode of the peripheral devices 100 to a normal operation mode when the amount of the average consumed power in the peripheral devices 100 does not exceed the predetermined value. Furthermore, the control unit 200 may set the operation mode of the peripheral devices 100 to an idle mode for ceasing the operation of the peripheral devices 100 when the amount of the average consumed power in the peripheral devices 100 exceeds the predetermined value, and may set the operation mode of the peripheral devices 100 to a normal operation mode when the amount of average consumed power in the peripheral devices 100 does not exceed the predetermined value.

In this case, the control unit 200 may perform control so that the power consumption of the peripheral devices 100 is reduced when the power consumed in the diversity unit 400 exceeds a predetermined level in the case where the operation mode of the peripheral devices 100 is set to a normal operation mode. Furthermore, the control unit 200 may deactivate the function of a part of the peripheral devices 100 when the power consumed in the diversity unit 400 exceeds the predetermined level in the case where the operation mode of the peripheral devices 100 is set to a normal operation mode. For example, of the peripheral devices 100, the function of a camera may be deactivated under the control of the control unit 200. Besides, the method in which the control unit 200 controls the power consumption of the peripheral devices 100 may be implemented in various forms according to embodiment.

Furthermore, when the power consumed in the diversity unit 400 exceeds the predetermined level even in the case where the operation mode of the peripheral devices 100 is set to a power-saving mode, it is possible to perform control so that the power consumption of the peripheral devices is even further reduced or to deactivate the function of a part of peripheral devices.

Figure 6:
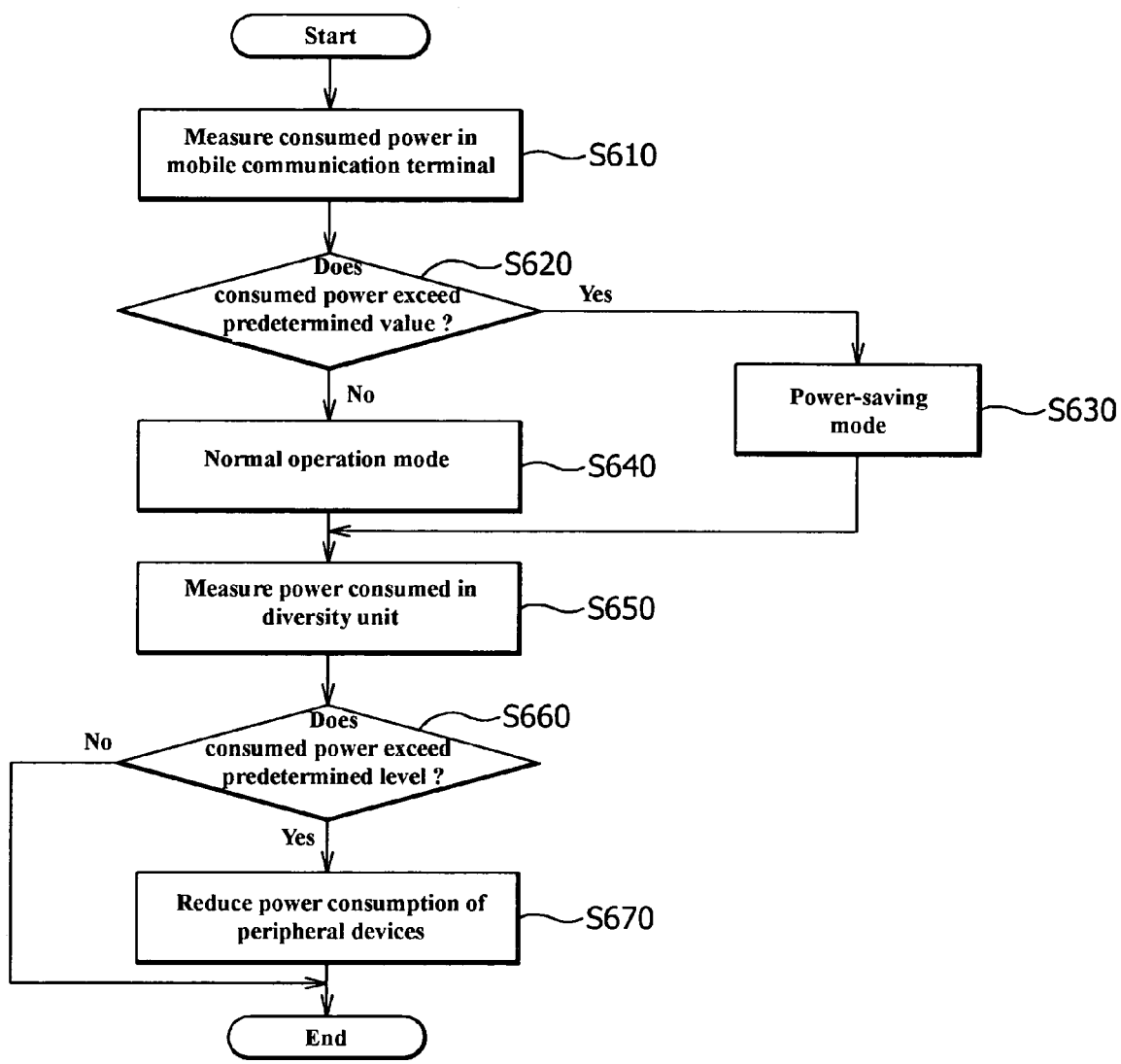
FIG. 6 is a flowchart illustrating a method of controlling the power consumption of the mobile communication terminal according to another embodiment of the present.

FIG. 6 is a flowchart illustrating a method of controlling power consumption in the mobile communication terminal according to another embodiment of the present. The control unit 200 measures the consumed power in the mobile communication terminal at step S610. The control unit 200 determines whether the measured consumed power exceeds a predetermined value at step S620. If the measured average consumed power exceeds the predetermined value, the operation mode of the peripheral devices 100 is set to a power-saving mode for lowering the power consumption of the peripheral devices 100 at step S630. If the measured consumed power does not exceed the predetermined value, the operation mode of the peripheral devices 100 is set to a normal operation mode at step S640. In an embodiment of the present invention, the operation mode of the peripheral devices 100 may be set to an idle mode for ceasing the operation of the peripheral devices 100 when the measured consumed power exceeds the predetermined value.

Thereafter, the power consumed in the diversity unit 400 is measured at step S650. It is determined whether the power consumed in the diversity unit 400 exceeds the predetermined level at step S660. If the power consumed in the diversity unit 400 exceeds the predetermined level in the case where the mode of the mobile communication terminal is set to a normal operation mode, the peripheral devices 100 is controlled such that the consumed power thereof is reduced at step S670. In an embodiment of the present invention, if the power consumed in the diversity unit 400 exceeds the predetermined level in the case where the mode of the peripheral devices 100 is set to a normal operation mode, the function of a part of the peripheral devices 100 may be deactivated. For example, of the peripheral devices 100, the function of a display device may be deactivated.

As described above, in accordance with the present invention, the power consumption of peripheral devices is appropriately controlled when consumed power increases due to the diversity function, so that unnecessary power consumption can be reduced, therefore the lifespan of a battery can be prolonged.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile communication terminal, comprising:
   a first peripheral device comprising a display device, a camera, or a speaker;
   a diversity unit to implement a diversity function;
   a power measurement unit to measure power consumed in the diversity unit; and
   a control unit to control power consumption of the first peripheral device based on an amount of the consumed power read from the power measurement unit.

2. The mobile communication terminal as set forth in claim 1, wherein the control unit controls the power consumption of the first peripheral device to be reduced if the amount of consumed power read from the power measurement unit exceeds a predetermined value.

3. The mobile communication terminal as set forth in claim 1, wherein the control unit controls a function of the first peripheral device to be deactivated if the amount of consumed power read from the power measurement unit exceeds a predetermined value.

4. The mobile communication terminal as set forth in claim 1, wherein the first peripheral device is the display device.

5. A method for controlling power consumption of a mobile communication terminal, the mobile communication terminal comprising a diversity unit to implement a diversity function, the method comprising:
   a first step of measuring power consumed in the diversity unit; and
   a second step of controlling power consumption of a first peripheral device of the mobile communication terminal based on an amount of measured power consumed in the diversity unit,
   wherein the first peripheral device comprises a display device, a camera, or a speaker.

6. The method as set forth in claim 5, wherein, at the second step, controlling the power consumption of the first peripheral device comprises reducing the power consumption of the first peripheral device if the power consumed in the diversity unit exceeds a predetermined value.

7. The method as set forth in claim 5, wherein, at the second step, controlling the power consumption of the first peripheral device comprises deactivating a function of the first peripheral device if the power consumed in the diversity unit exceeds a predetermined value.

8. The method as set forth in claim 5, wherein the first peripheral device is the display device.

9. The mobile communication terminal of claim 1, further comprising a second peripheral device,
   wherein the control unit controls power consumption of the second peripheral device based on an amount of the consumed power read from the power measurement unit.

10. The mobile communication terminal of claim 9, wherein the control unit controls the power consumption of the second peripheral device to be reduced if the amount of consumed power read from the power measurement unit exceeds a predetermined value.

11. The mobile communication terminal of claim 9, wherein the control unit controls a function of the second peripheral device to be deactivated if the amount of consumed power read from the power measurement unit exceeds a predetermined value.

12. The method of claim 5, further comprising a third step of controlling power consumption of a second peripheral device of the mobile communication terminal based on the amount of measured power consumed in the diversity unit.

13. The method of claim 12, wherein at the third step, controlling the power consumption of the second peripheral device comprises reducing the power consumption of the second peripheral device if the power consumed in the diversity unit exceeds a predetermined value.

14. The method of claim 12, wherein, at the third step, controlling the power consumption of the second peripheral device comprises deactivating a function of the second peripheral device if the power consumed in the diversity unit exceeds a predetermined value.

* * * * *